United States Patent
Edgecombe et al.

(10) Patent No.: US 11,650,935 B2
(45) Date of Patent: May 16, 2023

(54) TECHNOLOGIES FOR SECURE KEY PROVISIONING WITH A MANAGEABILITY ENGINE

(71) Applicant: Intel Corporation, Santa Clara, CA (US)

(72) Inventors: Richard Edgecombe, Portland, OR (US); Reshma Lal, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 189 days.

(21) Appl. No.: 16/234,726

(22) Filed: Dec. 28, 2018

(65) Prior Publication Data
US 2019/0158277 A1 May 23, 2019

Related U.S. Application Data

(60) Provisional application No. 62/687,403, filed on Jun. 20, 2018.

(51) Int. Cl.
*G06F 9/455* (2018.01)
*H04L 9/08* (2006.01)
(Continued)

(52) U.S. Cl.
CPC ........ *G06F 12/1408* (2013.01); *G06F 9/3877* (2013.01); *G06F 9/45558* (2013.01);
(Continued)

(58) Field of Classification Search
CPC ...... G06F 21/76; G06F 21/79; G06F 12/1408; G06F 9/3877; G06F 9/45558;
(Continued)

(56) References Cited

U.S. PATENT DOCUMENTS 9,141,769 B1 * 9/2015 Hitchcock ............. H04L 9/0897
9,215,249 B2 * 12/2015 Smith ................... H04L 63/061
(Continued)

OTHER PUBLICATIONS

Q. Hu, M. R. Asghar and N. Brownlee, "Certificate Revocation Guard (CRG): An Efficient Mechanism for Checking Certificate Revocation," 2016 IEEE 41st Conference on Local Computer Networks (LCN), Dubai, 2016, pp. 527-530, doi: 10.1109/LCN.2016.84. (Year: 2016).*

*Primary Examiner* — Trang T Doan
(74) *Attorney, Agent, or Firm* — Jaffery Watson Mendonsa & Hamilton LLP

(57) ABSTRACT

Technologies for secure key provisioning include a computing device having a processor with secure enclave support and a manageability controller. The manageability controller receives a secret key from a network source via a network interface that is isolated from untrusted software of the computing device. The manageability controller authenticates a secure enclave of the computing device and, if successful, securely provisions a session key derived from the secret key to the secure enclave. The manageability controller may provision additional session keys after expiration of the session key. The manageability controller may monitor for revocation of the secret key by the network source. If revoked, the manageability controller does not provision additional session keys to the secure enclave. The manageability controller may also provision the session key to a sensor device protected by the secret key, which is pre-provisioned to the sensor device. Other embodiments are described and claimed.

17 Claims, 3 Drawing Sheets

(51) Int. Cl.

| | |
|---|---|
| *G06F 12/14* | (2006.01) |
| *H04L 9/32* | (2006.01) |
| *G06F 21/76* | (2013.01) |
| *G06F 21/60* | (2013.01) |
| *G06F 21/57* | (2013.01) |
| *G06F 21/64* | (2013.01) |
| *H04L 41/28* | (2022.01) |
| *G06F 21/79* | (2013.01) |
| *H04L 41/046* | (2022.01) |
| *H04L 9/06* | (2006.01) |
| *G06F 9/38* | (2018.01) |
| *G06F 12/0802* | (2016.01) |

(52) U.S. Cl.
CPC .......... *G06F 12/0802* (2013.01); *G06F 21/57* (2013.01); *G06F 21/602* (2013.01); *G06F 21/606* (2013.01); *G06F 21/64* (2013.01); *G06F 21/76* (2013.01); *G06F 21/79* (2013.01); *H04L 9/0631* (2013.01); *H04L 9/0637* (2013.01); *H04L 9/083* (2013.01); *H04L 9/085* (2013.01); *H04L 9/0838* (2013.01); *H04L 9/0844* (2013.01); *H04L 9/0891* (2013.01); *H04L 9/321* (2013.01); *H04L 9/3215* (2013.01); *H04L 9/3226* (2013.01); *H04L 9/3268* (2013.01); *H04L 9/3278* (2013.01); *H04L 41/046* (2013.01); *H04L 41/28* (2013.01); *G06F 2009/45591* (2013.01); *G06F 2009/45595* (2013.01)

(58) Field of Classification Search
CPC .... G06F 12/0802; G06F 21/57; G06F 21/602; G06F 21/606; G06F 21/64; G06F 2009/45591; G06F 2009/45595; H04L 9/0631; H04L 9/0637; H04L 9/083; H04L 9/0838; H04L 9/0844; H04L 9/085; H04L 9/0891; H04L 9/321; H04L 9/3215; H04L 9/3226; H04L 9/3268; H04L 9/3278; H04L 41/046; H04L 41/28
See application file for complete search history.

(56) References Cited

U.S. PATENT DOCUMENTS

| | | | | |
|---|---|---|---|---|
| 10,469,265 | B2* | 11/2019 | Xing | H04L 9/3242 |
| 10,515,317 | B1* | 12/2019 | Kenthapadi | G06Q 50/01 |
| 2010/0178977 | A1* | 7/2010 | Kim | H04L 9/006 |
| | | | | 463/43 |
| 2014/0281544 | A1* | 9/2014 | Paczkowski | H04W 12/35 |
| | | | | 713/171 |
| 2015/0113241 | A1* | 4/2015 | Martin | G06F 12/14 |
| | | | | 711/163 |
| 2015/0347768 | A1* | 12/2015 | Martin | G06F 21/56 |
| | | | | 726/1 |
| 2016/0119318 | A1* | 4/2016 | Zollinger | H04L 9/3242 |
| | | | | 713/171 |
| 2016/0352701 | A1* | 12/2016 | Vora | H04L 9/085 |
| 2016/0381005 | A1* | 12/2016 | Vij | H04L 63/10 |
| | | | | 726/7 |
| 2017/0005809 | A1* | 1/2017 | Adam | H04L 9/3268 |
| 2017/0104597 | A1* | 4/2017 | Negi | H04L 9/0825 |
| 2018/0365406 | A1* | 12/2018 | Elnekaveh | H04L 9/0897 |

* cited by examiner

TECHNOLOGIES FOR SECURE KEY PROVISIONING WITH A MANAGEABILITY ENGINE

CROSS-REFERENCE TO RELATED APPLICATION

The present application claims the benefit of U.S. Provisional Patent Application No. 62/687,403, filed Jun. 20, 2018.

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary. SGX also provides remote anonymous attestation of secure enclaves, which allows the authenticity of a secure enclave to be verified without revealing the particular identity of the platform executing the secure enclave.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
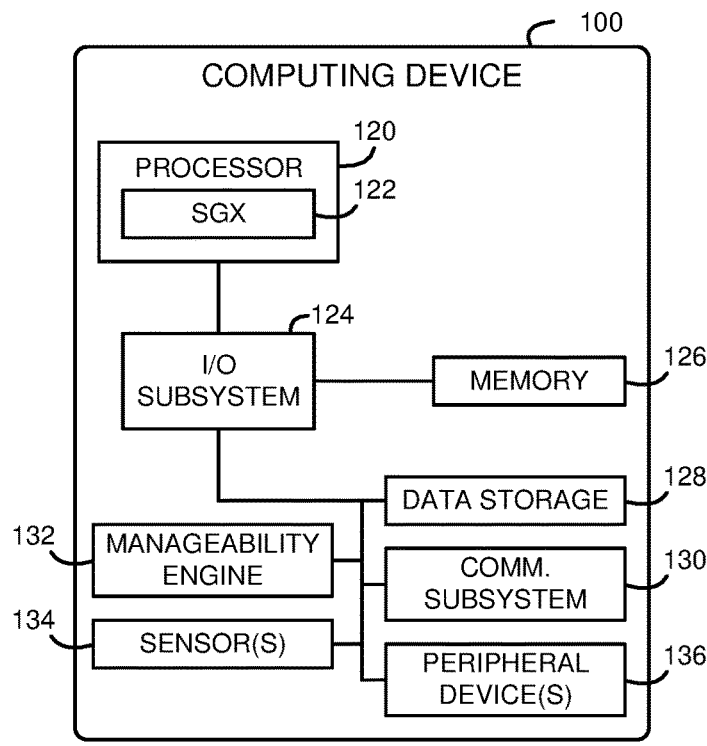
FIG. 1 is a simplified block diagram of at least one embodiment of a computing device for secure key provisioning.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for secure key provisioning includes a processor 120 with secure enclave support 122 and a manageability engine 132. In use, as described further below, the manageability engine 132 receives a secret key from a network source. The manageability engine 132 may receive the secret key via an out-of-band network interface that is independent of the processor 120. The manageability engine 132 performs a local attestation of a secure enclave executed with the secure enclave support 122 of the processor 120. If successfully attested, the manageability engine 132 provisions a session key derived from the secret key to the secure enclave. Thus, the computing device 100 allows secret keys to be provisioned to secure enclaves without the involvement of the operating system, which may be untrusted. Additionally, the network communication of the manageability engine 132 can identify the platform, which allows the secret key to be platform-specific. Additionally, as described below, the computing device 100 may also handle revocations of the secret key independent of any operating system and thus may avoid certain denial-of-service attacks on key revocation.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, a distributed computing device, a disaggregated computing device, and/or a consumer electronic device. As shown in FIG. 1, the illustrative computing device 100 includes a processor 120, an I/O subsystem 124, a memory 126, a data storage device 128, and a manageability engine 132. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 126. The secure enclave support 122 may be embodied as a set of processor instruction extensions that allows the processor 120 to establish one or more secure enclaves in the memory 126. For example, the secure enclave support 122 may be embodied as Intel® Software Guard Extensions (SGX) technology.

The memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. As described above, in some embodiments, code and data included in a secure enclave may be encrypted and stored in the memory 126. Illustratively, the memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 126 may be directly coupled to the processor 120, for example via an integrated memory controller hub or a data port. The I/O subsystem 124 may further include a sideband network, secure fabric, or other secure routing support. The secure routing support may include hardware support to ensure I/O data cannot be misrouted in the I/O subsystem 124 under the influence of rogue software. Additionally, in some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 130, which may be embodied as any communication circuit, device, or collection thereof, capable of enabling communications between the computing device 100 and other remote devices over a computer network (not shown). The communications subsystem 130 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

As shown, the computing device 100 further includes a manageability engine 132. The manageability engine 132 may be embodied as any hardware controller(s), component(s), or other circuitry capable of providing manageability and security-related services to the computing device 100. In particular, the manageability engine 132 may include a microprocessor, microcontroller, coprocessor, or other embedded controller capable of executing firmware and/or other code independently and securely from the processor 120. Thus, the manageability engine 132 may be used to establish a trusted execution environment for the computing device 100. The manageability engine 132 is also capable of out-of-band network communication with remote devices over a computer network, independently and securely from the processor 120. For example, the manageability engine 132 may include one or more dedicated network interfaces or network ports. Additionally or alternatively, the manageability engine 132 may perform out-of-band network communication using the communications subsystem 130.

The manageability engine 132 may communicate with the processor 120 and/or other components of the computing device 100 over a dedicated bus, such as a host embedded controller interface (HECI). The manageability engine 132 may also provide remote configuration, control, or management of the computing device 100. Illustratively, the manageability engine 132 is incorporated in a system-on-a-chip (SoC) of the computing device 100; however, in some embodiments, the computing device 100 may include one or more additional components capable of establishing a trusted execution environment, such as a security engine, an out-of-band processor, a converged security and manageability engine (CSME), a Trusted Platform Module (TPM), and/or another security engine device or collection of devices. In some embodiments the manageability engine 132 may be included in a platform controller hub (PCH) or other SoC along one or more integrated sensors 134, peripherals 136, functional blocks, integrated IP blocks, integrated controllers, or other integrated devices. For example, the manageability engine 132 may be integrated with a USB controller, audio controller, integrated sensor hub, or other component. In those embodiments, the manageability engine 132 may communicate to integrated sensors 134 or peripheral devices 136 using a secure sideband channel or sideband network with hardware access control, such as Security Attribute of the Initiator (SAI). For example, the hardware access control may allow the manageability engine 132 to access (e.g., read and/or write) certain protected registers of the integrated component.

As shown, the computing device 100 may further include one or more sensors 134 and/or other peripheral devices 136. For example, the sensors 134 may be embodied as one or more biometric sensors such as fingerprint readers, facial feature mappers, retinal scanners, or other biometric devices, and the peripheral devices 136 may include any number of additional input/output devices, interface devices, or other peripheral devices, such as keyboards, mice, touch screens, graphics circuitry, microphones, cameras, speaker systems, network interfaces, and/or other peripheral devices. As described further below, each of the sensors 134 or peripheral devices 136 may be pre-provisioned with a master secret key, for example by a manufacturer or vendor of the sensor 134 or device 136. The secret key may be used to protect session keys used by the sensors 134 and/or peripheral devices 136 to communicate securely with one or more secure enclaves of the computing device 100.

Figure 2:
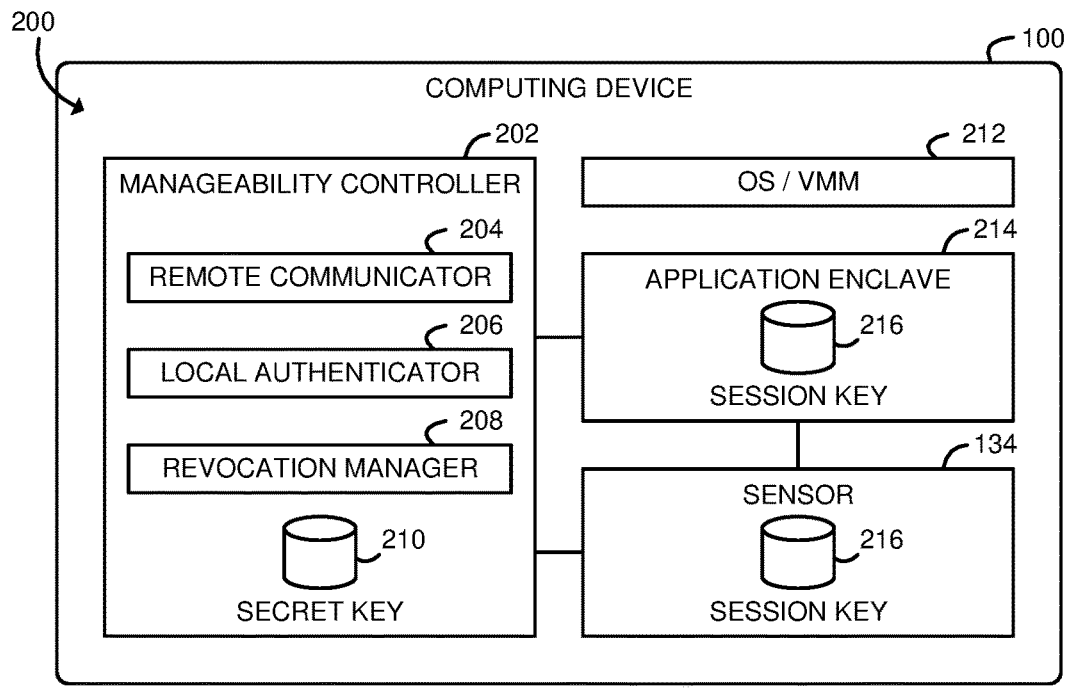
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes a manageability controller 202, an operating system (OS)/virtual machine monitor (VMM) 212, an application enclave 214, and a sensor 134. The manageability controller 202 includes a remote communicator 204, a local authenticator 206, and a revocation manager 208. The various components of the environment 200 may be embodied as hardware, firmware, software, or a combination thereof. As such, in some embodiments, one or more of the components of the environment 200 may be embodied as circuitry or collection of electrical devices (e.g., remote communicator circuitry 204, local authenticator circuitry 206, revocation manager circuitry 208, and/or application enclave circuitry 214). It should be appreciated that, in such embodiments, one or more of the remote communicator circuitry 204, the local authenticator circuitry 206, the revocation manager circuitry 208, and/or the application enclave circuitry 214 may form a portion of the processor 120, the I/O subsystem 124, the manageability engine 132, and/or other components of the computing device 100. Additionally, in some embodiments, one or more of the illustrative components may form a portion of another component and/or one or more of the illustrative components may be independent of one another.

The OS/VMM 212 may be embodied as one or more operation systems, virtual machine monitors, hypervisors, pre-boot firmware environment, or other runtime or boot components of the computing device 100. The OS/VMM 212 are executed by the processor 120. The OS/VMM 212 is not trusted by the application enclave 214; that is, the OS/VMM 212 is outside of the trusted code base (TCB) of the application enclave 214.

The manageability controller 202 may be embodied as the manageability engine 132 or other co-processor capable of operating independently of the processor 120, including operating independently of the OS/VMM 212 or other runtime environment of the computing device 100. The remote communicator 204 is configured to receive a secret key 210 from a network source. The secret key 210 may be received via a network interface of the manageability controller 202 that is isolated from the OS/VMM 212 or other untrusted software.

The local authenticator 206 is configured to authenticate the application enclave 214 of the computing device 100. Authenticating the application enclave 214 may include performing a local attestation to verify an identity of the application enclave 214. The local authenticator 206 is further configured to securely provision a session key 216 derived from the secret key 210 to the application enclave 214 in response to successful authentication of the application enclave 214. In some embodiments, the secret key 210 itself may be provisioned to the application enclave 214. The local authenticator 206 may be further configured to securely provision the session key 216 to a sensor 134 or other peripheral device 136 in response to successful authentication of the application enclave 214. The session key 216 provisioned to the sensor 134 may be encrypted with the secret key 210, which is pre-provisioned to the sensor 134. As described further below, the local authenticator 206 may be further configured to securely provision additional session keys 216 derived from the secret key 210 to the application enclave 214 if the original session key 216 has expired and the secret key 210 has not been revoked.

The revocation manager 208 is configured to determine whether the session key 216 has expired in response to securely provisioning the session key 216 to the application enclave 214. The revocation manager 208 is further configured to determine whether the secret key 210 has been revoked by the network source, for example by communicating with the network source via a network interface of the manageability controller 202 that is isolated from the OS/VMM 212 or other untrusted software.

The application enclave 214 is a trusted execution environment that is isolated from the OS/VMM 212 and other untrusted software of the computing device 100. The application enclave 214 is authenticated and protected from unauthorized access using hardware support of the computing device 100, such as the secure enclave support 122 of the processor 120. Illustratively, the application enclave 214 is embodied as a secure enclave established using Intel SGX technology. The computing device 100 may load the application enclave 214 using the secure enclave support 122 of the processor 120. Loading the application enclave 214 may verify, authenticate, or otherwise ensure that the application enclave 214 was provided by an identified authority and has not been tampered with. For example, the processor 120 may measure the code and/or data of the application enclave 214 as it is loaded into the memory 126 and verify that measurement. Additionally, the application enclave 214 may be cryptographically signed by an authority such as a device manufacturer, operating system vendor, administrator, or other authority associated with the application enclave 214. Additionally or alternatively, although illustrated as a single application enclave 214, it should be understood that in some embodiments the computing device 100 may establish multiple application enclaves 214 and/or system enclaves (e.g., a quoting enclave, a platform services enclave, or other enclave).

After loading, measuring, and finalizing the application enclave 214, the computing device 100 may execute the application enclave 214. The application enclave 214 is configured to perform a cryptographic operation with the session key 216 in response to securely provisioning the session key 216. Performing the cryptographic operation may include receiving data from the sensor 134 that has been encrypted with the session key 216.

Figure 3:
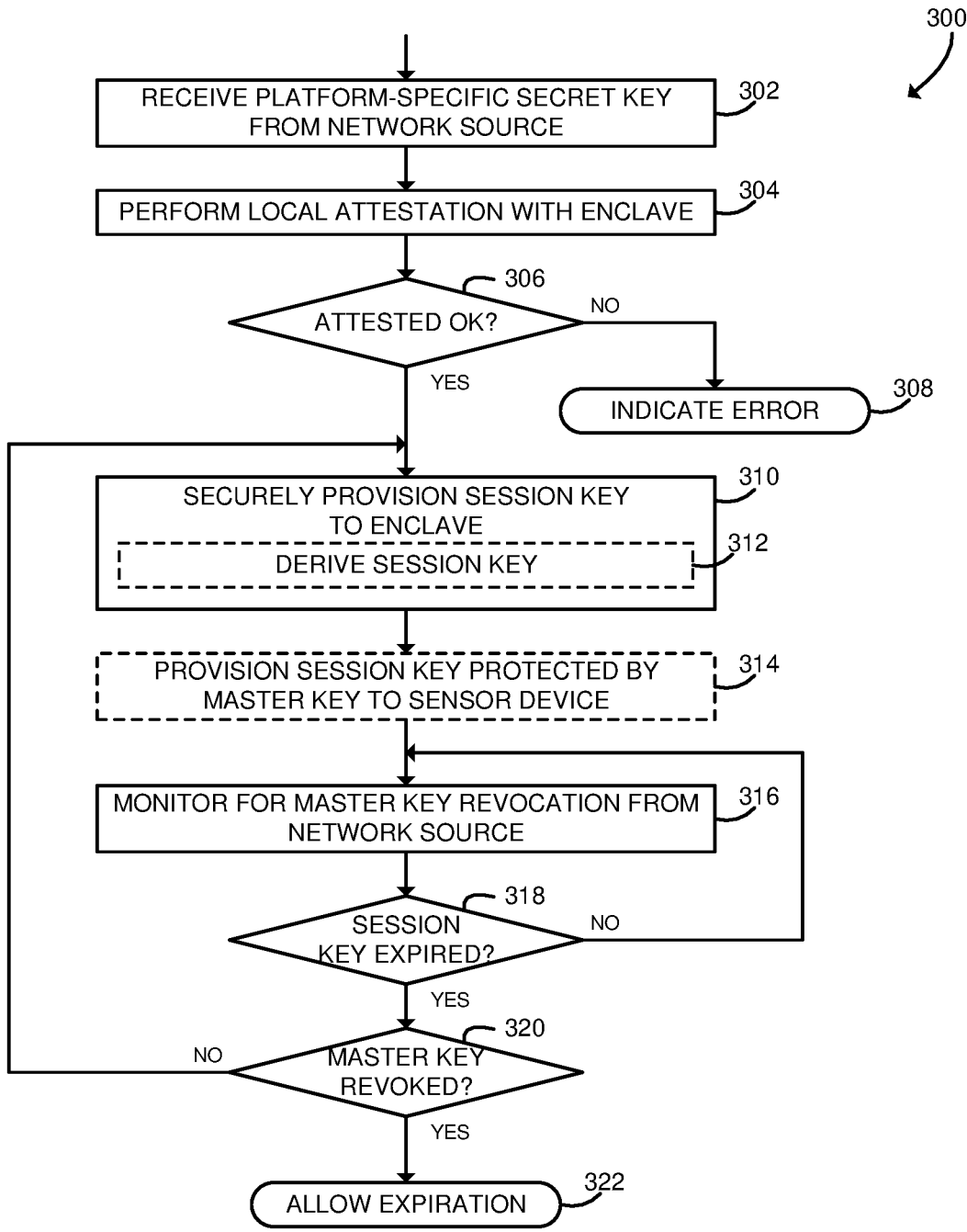
FIG. 3 is a simplified flow diagram of at least one embodiment of a method for secure key provisioning that may be executed by a manageability engine of the computing device of FIGS. 1-2.

Referring now to FIG. 3, in use, the computing device 100 may execute a method 300 for secure key provisioning. It should be appreciated that, in some embodiments, the operations of the method 300 may be performed by one or more components of the environment 200 of the computing device 100 as shown in FIG. 2, such as the manageability controller 202. The method 300 begins in block 302, in which the manageability engine 132 of the computing device 100 receives a platform-specific secret key 210 from a network source. For example, the manageability engine 132 may receive the secret key 210 from a network server such as an enterprise administrator, device manufacturer, or other remote network source. The network source may use the network address or other network identification of the manageability engine 132 as a platform identity, and the particular secret key 210 provided by the network source may depend on that platform identity. The secret key 210 may be received using any secure network protocol, management interface, or other secure interface. In some embodiments, the manageability engine 132 receives the secret key 210 with an out-of-band network interface that is independent of the processor 120, including any untrusted software executed by the processor 120 (such as the OS/VMM 212). After receipt, the manageability engine 132 may securely store the secret key 210, for example in an internal, tamper-proof storage of the manageability engine 132 (e.g., flash memory or other persistent storage). The secret key 210 is thus protected at rest from access by untrusted software. As described further below, the secret key 210 may be embodied as a master key that is used to derive multiple session keys 216.

In block 304, the manageability engine 132 performs local attestation with a secure enclave 214 (e.g., an application enclave 214). The manageability engine 132 may perform any technique to securely verify the identity and authenticity of the secure enclave 214. For example, the manageability engine 132 may verify one or more identities of the secure enclave 214, such as a signing identity of an authority associated with the secure enclave 214, an enclave identity, an enclave measurement, or a certificate associated with the secure enclave 214. In some embodiments, the secure enclave 214 may generate a report or a quote that includes the enclave identity using one or more processor 120 instructions, and the manageability engine 132 may verify that report (e.g., by verifying a signature of the report or other data). In some embodiments, the secure enclave 214 may provide the report to the manageability engine 132 via a system enclave that is in communication with the manageability engine 132, such as a platform services enclave or a quoting enclave.

In block 306, the manageability engine 132 determines whether the secure enclave 214 was successfully attested. If not, the method 300 branches to block 308, in which the manageability engine 132 indicates an attestation error. For example, the computing device 100 may log an error, display an error message to a user, or otherwise indicate that attestation of the secure enclave 214 was not successful. In some embodiments, in response to an attestation error, the computing device 100 may halt operation or otherwise prohibit access to the computing device 100. Referring back to block 306, if the attestation was successful, the method 300 advances to block 310.

In block 310, the manageability engine 132 securely provisions a session key 216 to the secure enclave 214. The manageability engine 132 may use any technique that is protected from untrusted software, hardware, or other components of the computing device 100 to securely send session key 216 to the secure enclave 214. For example, the manageability engine 132 may perform a SIGMA key exchange protocol, or any other appropriate secure key exchange protocol to provision the session key 216. In some embodiments, in block 312 the manageability engine 132 may derive the session key 216 based on the secret key 210. The manageability engine 132 may use any technique to derive the session key 216.

In some embodiments, in block 314 the manageability engine 132 may provision the session key 216 to a sensor 134 or other peripheral device 136. The session key 216 may be encrypted or otherwise protected by the secret key 210. In those embodiments, the secret key 210 may be pre-provisioned to the sensor 134, for example by being embedded in the sensor 134 during manufacturing. Additionally or alternatively, in some embodiments the session key 216 may be provisioned to the sensor 134 or other peripheral device 136 over a secure sideband channel, sideband network, secure fabric, or other secure routing. For example, in some embodiments the manageability engine 132 may be included in a platform controller hub (PCH) or other system-on-a-chip (SoC) with one or more integrated functional blocks, integrated IP blocks, integrated controllers, or other integrated devices. For example, the manageability engine 132 may be integrated with a USB controller, audio controller, integrated sensor hub, or other component. In those embodiments, the manageability engine 132 may communicate to integrated sensors 134 or peripheral devices 136 using a secure sideband network with hardware access control, such as Security Attribute of the Initiator (SAI). In those embodiments, because the secure sideband network is protected by hardware access control, the session key 216 may not be protected by the secret key 210, and thus the secrete key 210 may not need to be provisioned to the integrated sensors 134 or peripheral devices 136 at manufacturing time. After the session key 216 is provisioned to the secure enclave 214 and, in some embodiments, the sensor 134 and/or peripheral device 136, the secure enclave 214 may perform cryptographic operations with the session key 216 as described further below in connection with FIG. 4.

In block 316, the manageability engine 132 monitors for secret key 210 revocation from the network source. The secret key 210 may be revoked, for example, based on one or more security policies (e.g., time limits), in response to a security breach, or in other circumstances. The manageability engine 132 may poll the network source or otherwise receive a revocation list or other data from the network source that indicates that the secret key 210 has been revoked. The manageability engine 132 may receive the revocation data with an out-of-band network interface that is independent of the processor 120, including any untrusted software executed by the processor 120 (such as the OS/VMM 212). Thus, the secret key 210 may be revoked even if supervisory software such as the OS/VMM 212 is compromised, which may prevent certain denial of service attacks. For example, because the network interface is out-of-band, a compromised OS may not be able to intercept revocation data or otherwise prevent the manageability engine 132 from receiving the revocation data.

In block 318, the manageability engine 132 determines whether the session key 216 has expired. Each session key 216 may have an expiration date/time, and in some embodiments the expiration time may be relatively short. For example, in some embodiments each session key 216 may expire after one or two minutes. If it is determined the session key 216 has not expired, the method 300 loops back to block 316 to continue monitoring for secret key 210 revocation. If the session key 216 has expired, the method 300 advances to block 320.

In block 320, the manageability engine 132 determines whether the secret key 210 has been revoked. For example, the manageability engine 132 may analyze revocation data received from the network source as described above. If the secret key 210 has not been revoked, the method 300 loops back to block 310, in which the manageability engine 132 derives an additional session key 216 and provisions the new session key 216 to the secure enclave 214 and/or sensor 134.

If the secret key 210 was revoked, the method 300 branches to block 322, in which the manageability engine 132 allows expiration of the session key 216. After the session key 216 has expired, the secure enclave 214 no longer performs cryptographic operations using the session key 216.

Figure 4:
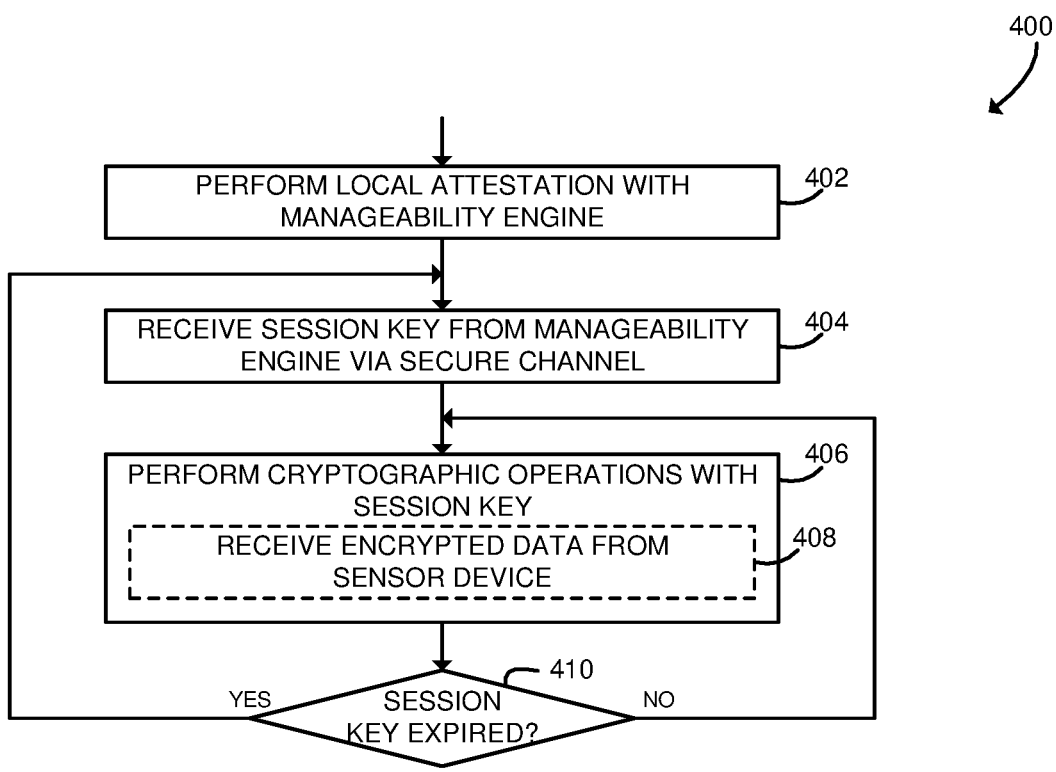
FIG. 4 is a simplified flow diagram of at least one embodiment of a method for secure key provisioning that may be executed by a secure enclave of the computing device of FIGS. 1-2.

Referring now to FIG. 4, in use, the computing device 100 may execute a method 400 for secure key provisioning. It should be appreciated that, in some embodiments, the operations of the method 400 may be performed by one or more components of the environment 200 of the computing device 100 as shown in FIG. 2, such as the application enclave 214. The method 400 begins in block 402, in which a secure enclave 214 of the computing device 100 performs local attestation with the manageability engine 132. As described above, the secure enclave 214 may perform any technique to securely attest to the identity and authenticity of the secure enclave 214. For example, the secure enclave 214 may attest to one or more identities of the secure enclave 214, such as a signing identity of an authority associated with the secure enclave 214, an enclave identity, an enclave measurement, or a certificate associated with the secure enclave 214. In some embodiments, the secure enclave 214 may generate a report or a quote that includes the enclave identity using one or more processor 120 instructions (e.g., EREPORT and EGETKEY). That report may be verified by the manageability engine 132, as described above. In some embodiments, the application enclave 214 may provide the report to the manageability engine 132 via a system enclave that is in communication with the manageability engine 132, such as a platform services enclave or a quoting enclave.

In block 404, the secure enclave 214 receives a session key 216 from the manageability engine 132 via a secure channel. The secure enclave 214 may use any technique that is protected from untrusted software, hardware, or other components of the computing device 100 to securely receive the session key 216 from the manageability engine 132. For example, the secure enclave 214 may perform a SIGMA key exchange protocol, or any other appropriate secure key exchange protocol to receive the session key 216.

In block 406, the secure enclave 214 performs one or more cryptographic operations with the session key 216. For example, the secure enclave 214 may use the session key 216 to protect one or more communication channels, to encrypt or decrypt stored data, or to perform other cryptographic operations. In some embodiments, in block 408 the secure enclave 214 may receive data from the sensor 134 that is encrypted using the session key 216. As described above, the session key 216 may be securely provisioned to the sensor 134 or other peripheral device 136 by the manageability engine 132. Thus, the encrypted sensor data may be protected from untrusted software of the computing device 100, including the OS/VMM 212.

In block 410, the secure enclave 214 determines whether the session key 216 has expired. As described above, each session key 216 may have an expiration date/time, and in some embodiments the expiration time may be relatively short. For example, in some embodiments each session key 216 may expire after one or two minutes. If the session key 216 has not expired, the method 400 loops back to block 406, in which the secure enclave 214 continues to perform cryptographic operations with the session key 216. If the session key 216 has expired, the method 400 loops back to block 404, in which the secure enclave 214 may receive a new session key 216 from the manageability engine 132. As described above, if the secret key 210 is revoked, the manageability engine 132 does not provision a new session key 216, and thus the secure enclave 214 performs no additional cryptographic operations with the session key 216.

It should be appreciated that, in some embodiments, the methods 300 and/or 400 may be embodied as various instructions stored on a computer-readable media, which may be executed by the processor 120, the I/O subsystem 124, the manageability engine 132, and/or other components of the computing device 100 to cause the computing device 100 to perform the respective method 300 and/or 400. The computer-readable media may be embodied as any type of media capable of being read by the computing device 100 including, but not limited to, the memory 126, the data storage device 128, firmware devices, other memory or data storage devices of the computing device 100, portable media readable by a peripheral device 136 of the computing device 100, and/or other media.

EXAMPLES

Illustrative examples of the technologies disclosed herein are provided below. An embodiment of the technologies may include any one or more, and any combination of, the examples described below.

Example 1 includes a computing device for secret key management, the computing device comprising a manageability controller, wherein the manageability controller comprises: a remote communicator to receive a secret key from a network source; and a local authenticator to (i) authenticate a secure enclave of the computing device, wherein the secure enclave is isolated from untrusted software of the computing device, and (ii) securely provision a session key derived from the secret key to the secure enclave in response to authentication of the secure enclave.

Example 2 includes the subject matter of Example 1, and wherein: the manageability controller further comprises a revocation manager to determine whether the session key has expired in response to a secure provisioning of the session key to the secure enclave; and the local authenticator is further to securely provision a second session key derived from the secret key to the secure enclave in response to a determination that the session key has expired.

Example 3 includes the subject matter of any of Examples 1 and 2, and wherein: the revocation manager is further to determine whether the secret key has been revoked by the network source; and to securely provision the second session key comprises to securely provision the second session key in response to a determination that the secret key has not been revoked.

Example 4 includes the subject matter of any of Examples 1-3, and wherein to determine whether the secret key has been revoked comprises to communicate with the network source via a network interface that is isolated from the untrusted software.

Example 5 includes the subject matter of any of Examples 1-4, and wherein to securely provision the session key comprises to securely provision the secret key to the secure enclave.

Example 6 includes the subject matter of any of Examples 1-5, and further comprising a processor, wherein the secure enclave comprises a trusted execution environment established with secure enclave support of the processor.

Example 7 includes the subject matter of any of Examples 1-6, and wherein the manageability controller comprises a coprocessor of the computing device, wherein the coprocessor includes a network interface with the network source, wherein the network interface is isolated from the untrusted software.

Example 8 includes the subject matter of any of Examples 1-7, and further comprising the secure enclave, wherein the secure enclave is to perform a cryptographic operation with the session key in response to a secure provisioning of the session key.

Example 9 includes the subject matter of any of Examples 1-8, and further comprising a peripheral device, wherein to perform the cryptographic operation comprises to receive encrypted data from the peripheral device, wherein the encrypted data is encrypted with the session key.

Example 10 includes the subject matter of any of Examples 1-9, and wherein the local authenticator is further to securely provision the session key to the peripheral device in response to the authentication of the secure enclave, wherein the session key is encrypted with the secret key, and wherein the secret key is pre-provisioned to the peripheral device.

Example 11 includes the subject matter of any of Examples 1-10, and wherein the local authenticator is further to securely provision the session key to the peripheral device via a secure sideband channel in response to the authentication of the secure enclave.

Example 12 includes the subject matter of any of Examples 1-11, and wherein to authenticate the secure enclave comprises to perform a local attestation to verify an identity of the secure enclave.

Example 13 includes the subject matter of any of Examples 1-12, and wherein the untrusted software comprises a pre-boot firmware environment, an operating system, or a hypervisor.

Example 14 includes a method for secret key management, the method comprising: receiving, by a manageability controller of a computing device, a secret key from a network source; authenticating, by the manageability controller, a secure enclave of the computing device, wherein the secure enclave is isolated from untrusted software of the computing device; and securely provisioning, by the manageability controller, a session key derived from the secret key to the secure enclave in response to authenticating the secure enclave.

Example 15 includes the subject matter of Example 14, and further comprising: determining, by the manageability controller, whether the session key has expired in response to securely provisioning the session key to the secure enclave; and securely provisioning, by the manageability controller, a second session key derived from the secret key to the secure enclave in response to determining that the session key has expired.

Example 16 includes the subject matter of any of Examples 14 and 15, and further comprising: determining, by the manageability controller, whether the secret key has been revoked by the network source; wherein securely provisioning the second session key comprises securely provisioning the second session key in response to determining that the secret key has not been revoked.

Example 17 includes the subject matter of any of Examples 14-16, and wherein determining whether the secret key has been revoked comprises communicating with the network source via a network interface that is isolated from the untrusted software.

Example 18 includes the subject matter of any of Examples 14-17, and wherein securely provisioning the session key comprises securely provisioning the secret key to the secure enclave.

Example 19 includes the subject matter of any of Examples 14-18, and wherein the secure enclave comprises a trusted execution environment established with secure enclave support of a processor of the computing device.

Example 20 includes the subject matter of any of Examples 14-19, and wherein the manageability controller comprises a coprocessor of the computing device, wherein the coprocessor includes a network interface with the network source, wherein the network interface is isolated from the untrusted software.

Example 21 includes the subject matter of any of Examples 14-20, and further comprising performing, by the secure enclave, a cryptographic operation with the session key in response to securely provisioning the session key.

Example 22 includes the subject matter of any of Examples 14-21, and wherein performing the cryptographic operation comprises receiving encrypted data from a peripheral device of the computing device, wherein the encrypted data is encrypted with the session key.

Example 23 includes the subject matter of any of Examples 14-22, and further comprising securely provisioning, by the manageability controller, the session key to the peripheral device in response to authenticating the secure enclave, wherein the session key is encrypted with the secret key, and wherein the secret key is pre-provisioned to the peripheral device.

Example 24 includes the subject matter of any of Examples 14-23, and further comprising securely provisioning, by the manageability controller, the session key to the peripheral device via a secure sideband channel in response to authenticating the secure enclave.

Example 25 includes the subject matter of any of Examples 14-24, and wherein authenticating the secure enclave comprises performing a local attestation to verify an identity of the secure enclave.

Example 26 includes the subject matter of any of Examples 14-25, and wherein the untrusted software comprises a pre-boot firmware environment, an operating system, or a hypervisor.

Example 27 includes a computing device comprising: a processor; and a memory having stored therein a plurality of instructions that when executed by the processor cause the computing device to perform the method of any of Examples 14-26.

Example 28 includes one or more non-transitory, computer readable storage media comprising a plurality of instructions stored thereon that in response to being executed result in a computing device performing the method of any of Examples 14-26.

Example 29 includes a computing device comprising means for performing the method of any of Examples 14-26.

The invention claimed is:

1. An apparatus comprising:
   a manageability controller circuitry coupled to or hosted by one or more processors, the manageability controller circuitry comprising:
   a remote communicator circuitry to receive a secret key from a network source; and
   a local authenticator circuitry to (i) authenticate a secure enclave of the apparatus, wherein the secure enclave is isolated from untrusted software of the apparatus, and (ii) securely provision a first session key derived from the secret key to the secure enclave in response to authentication of the secure enclave, wherein the local authenticator circuitry is further to securely provision a second session key derived from the secret key to the secure enclave in response to a determination that the first session key has expired, wherein the secure enclave comprises a trusted execution environment established with secure enclave support of the one or more processors, wherein the secure enclave facilitates a cryptographic operation with the first or second session keys in response to the secure provisioning of the first or second session keys, wherein the manageability controller circuitry further comprises a revocation manager circuitry to monitor a master key for revocation from the network source, wherein the master key includes the secret key, and wherein to monitor includes to determine whether the secret key has been revoked by the network source, wherein the revocation manager circuitry to determine whether the first session key has expired in response to the secure provisioning of the first session key to the secure enclave, wherein to securely provision the second session key comprises to securely provision the second session key in response to a determination that the secret key has not been revoked.

2. The apparatus of claim 1, wherein to determine whether the secret key has been revoked comprises to communicate with the network source via a network interface that is isolated from the untrusted software, wherein the manageability controller circuitry comprises a coprocessor having a network interface associated with the network source, wherein the network interface is isolated from the untrusted software.

3. The apparatus of claim 1, further comprising a peripheral device to perform the cryptographic operation to receive encrypted data from the peripheral device, wherein the encrypted data is encrypted with the first or second session keys.

4. The apparatus of claim 3, wherein the local authenticator circuitry is further to securely provision the first or second session key to the peripheral device in response to the authentication of the secure enclave, wherein the session key is encrypted with the secret key, and wherein the secret key is pre-provisioned to the peripheral device, wherein the local authenticator circuitry is further to securely provision the first or second session key to the peripheral device via a secure sideband channel in response to the authentication of the secure enclave.

5. The apparatus of claim 1, wherein to authenticate the secure enclave comprises to perform a local attestation to verify an identity of the secure enclave, wherein the untrusted software comprises one or more of a pre-boot firmware environment, an operating system, or a hypervisor.

6. A method comprising:
receiving, by a manageability controller circuitry, a secret key from a network source, wherein the manageability controller circuitry is coupled to or hosted by one or more processors of a computing device;
authenticating, by the manageability controller circuitry, a secure enclave of the computing device, wherein the secure enclave is isolated from untrusted software of the computing device;
securely provisioning, by the manageability controller, a first session key derived from the secret key to the secure enclave in response to authenticating the secure enclave, wherein security provisioning further includes securely provisioning a second session key derived from the secret key to the secure enclave in response to a determination that the first session key has expired, wherein the secure enclave comprises a trusted execution environment established with secure enclave support of the one or more processors, wherein the secure enclave facilitates a cryptographic operation with the first or second session keys in response to the secure provisioning of the first or second session keys; and
monitoring, by a revocation manager circuitry of the manageability controller circuitry, a master key for revocation from the network source, wherein the master key includes the secret key, and wherein monitoring includes determining whether the secret key has been removed revoked by the network source; and
determining, by the manageability controller circuitry, whether the first session key has expired in response to the secure provisioning of the first session key to the secure enclave, wherein to securely provision the second session key comprises to securely provision the second session key in response to a determination that the secret key has not been revoked.

7. The method of claim 6, wherein to determine whether the secret key has been revoked comprises to communicate with the network source via a network interface that is isolated from the untrusted software, wherein the manageability controller circuitry comprises a coprocessor having a network interface associated with the network source, wherein the network interface is isolated from the untrusted software.

8. The method of claim 7, further comprising performing, by the manageability controller circuitry, the cryptographic operation to receive encrypted data from the peripheral device, wherein the encrypted data is encrypted with the first or second session keys.

9. The method of claim 8, further comprising:
securely provisioning, by the manageability controller circuitry, the first or second session keys to the peripheral device in response to the authentication of the secure enclave, wherein the session key is encrypted with the secret key, and wherein the secret key is pre-provisioned to the peripheral device; and
securely provisioning, by the manageability controller circuitry, the first or second session keys to the peripheral device via a secure sideband channel in response to the authentication of the secure enclave.

10. The method of claim 6, wherein to authenticate the secure enclave comprises to perform a local attestation to verify an identity of the secure enclave, wherein the untrusted software comprises one or more of a pre-boot firmware environment, an operating system, or a hypervisor.

11. At least one non-transitory computer-readable medium having stored thereon instructions which, when executed, cause a computing device to perform operations comprising:
receiving a secret key from a network source, wherein receiving is facilitated by a manageability controller circuitry coupled to or hosted by one or more processors of the computing device;
authenticating a secure enclave of the computing device, wherein the secure enclave is isolated from untrusted software of the computing device;
securely provisioning a first session key derived from the secret key to the secure enclave in response to authenticating the secure enclave, wherein security provisioning further includes securely provisioning a second session key derived from the secret key to the secure enclave in response to a determination that the first session key has expired, wherein the secure enclave comprises a trusted execution environment established with secure enclave support of the one or more processors, wherein the secure enclave facilitates a cryptographic operation with the first or second session keys in response to the secure provisioning of the first or second session keys;

monitoring, by a revocation manager circuitry of the manageability controller circuitry, a master key for revocation from the network source, wherein the master key includes the secret key, and wherein monitoring includes determining whether the secret key has been revoked by the network source; and determining, by the manageability controller circuitry, whether the first session key has expired in response to the secure provisioning of the first session key to the secure enclave, wherein to securely provision the second session key comprises to securely provision the second session key in response to a determination that the secret key has not been revoked.

12. The at least non-transitory computer-readable medium of claim 11, wherein to determine whether the secret key has been revoked comprises to communicate with the network source via a network interface that is isolated from the untrusted software, wherein the manageability controller circuitry comprises a coprocessor having a network interface associated with the network source, wherein the network interface is isolated from the untrusted software.

13. The at least non-transitory computer-readable medium of claim 12, wherein the operations further comprise performing, by the manageability controller circuitry, the cryptographic operation to receive encrypted data from the peripheral device, wherein the encrypted data is encrypted with the first or second session keys.

14. The at least non-transitory computer-readable medium of claim 13, wherein the operations further comprise:

securely provisioning, by the manageability controller circuitry, the first or second session keys to the peripheral device in response to the authentication of the secure enclave, wherein the session key is encrypted with the secret key, and wherein the secret key is pre-provisioned to the peripheral device; and securely provisioning, by the manageability controller circuitry, the first or second session keys to the peripheral device via a secure sideband channel in response to the authentication of the secure enclave.

15. The at least non-transitory computer-readable medium of claim 11, wherein to authenticate the secure enclave comprises to perform a local attestation to verify an identity of the secure enclave, wherein the untrusted software comprises one or more of a pre-boot firmware environment, an operating system, or a hypervisor.

16. A system comprising:

one or more processors coupled to a memory, the one or more processors including one or more application processors or one or more graphics processors;

a manageability controller circuitry coupled to or hosted by the one or more processors, the manageability controller circuitry comprising:

a remote communicator circuitry to receive a secret key from a network source; and a local authenticator circuitry to (i) authenticate a secure enclave of the apparatus, wherein the secure enclave is isolated from untrusted software of the apparatus, and (ii) securely provision a first session key derived from the secret key to the secure enclave in response to authentication of the secure enclave, wherein the local authenticator circuitry is further to securely provision a second session key derived from the secret key to the secure enclave in response to a determination that the first session key has expired, wherein the secure enclave comprises a trusted execution environment established with secure enclave support of the one or more processors, wherein the secure enclave facilitates a cryptographic operation with the first or second session keys in response to the secure provisioning of the first or second session keys, wherein the manageability controller circuitry further comprises a revocation manager circuitry to monitor a master key for revocation from the network source, wherein the master key includes the secret key, and wherein to monitor includes to determine whether the secret key has been removed by the network source, wherein the revocation manager circuitry to determine whether the first session key has expired in response to the secure provisioning of the first session key to the secure enclave, wherein to securely provision the second session key comprises to securely provision the second session key in response to a determination that the secret key has not been revoked.

17. The system of claim 16, wherein to determine whether the secret key has been revoked comprises to communicate with the network source via a network interface that is isolated from the untrusted software, wherein the manageability controller circuitry comprises a coprocessor having a network interface associated with the network source, wherein the network interface is isolated from the untrusted software.

* * * * *